United States Patent [19]
Persha

[11] 3,979,649
[45] Sept. 7, 1976

[54] REMOTE SEARCHLIGHT CONTROL SYSTEM

[76] Inventor: Gerald C. Persha, 1912 W. 12 Mile Road, Royal Oak, Mich. 48073

[22] Filed: Aug. 9, 1974

[21] Appl. No.: 496,080

[52] U.S. Cl............................ 318/17; 307/157; 318/55; 318/547
[51] Int. Cl.².................................... H02P 7/20
[58] Field of Search................ 318/17, 547, 55; 307/157

[56] References Cited
UNITED STATES PATENTS

| | | | |
|---|---|---|---|
| 2,345,135 | 3/1944 | Lippman | 307/157 |
| 3,096,056 | 7/1963 | Allison | 318/547 |
| 3,174,086 | 3/1965 | Gorjanc | 318/54 X |
| 3,218,531 | 11/1965 | Smith et al. | 318/17 |
| 3,278,819 | 10/1966 | Oswald | 318/547 X |
| 3,355,643 | 11/1967 | Benson | 318/55 |
| 3,545,398 | 12/1970 | Fisher | 318/547 X |
| 3,675,097 | 7/1972 | Mulligan | 318/17 |
| 3,697,846 | 10/1972 | Mueller | 318/547 X |
| 3,781,625 | 12/1973 | Miyajima et al. | 318/17 X |

*Primary Examiner*—B. Dobeck
*Attorney, Agent, or Firm*—Harness, Dickey & Pierce

[57] ABSTRACT

A remote control system for controlling the azimuth and altitude of a searchlight and also a control for selecting one of two modes of operation, either spot or flood, of the searchlight. The system includes a dual remote control of the spotlight, for use in vehicles, such as boats, where it is desired to control the direction of the spotlight and mode of operation from two separate locations. The system includes means for locking out one remote control position when the other remote control system is actuated.

10 Claims, 2 Drawing Figures

REMOTE SEARCHLIGHT CONTROL SYSTEM

BACKGROUND OF THE DISCLOSURE

This invention relates to remote searchlight control systems and more particularly to a remote searchlight control system which includes dual controls wherein one control is locked out upon actuation of the other control.

A number of situations exist where it is desirable to mount an adjustable flood lamp or spot lamp on a vehicle, such as a boat, automobile or the like, wherein the lamp may be remotely operated to permit sweeping the beam both horizontally and vertically and controlling the mode of operation of the lamp. A number of manual type adjustable lamps have been provided in the past which normally employ control handles and shafts, Boden wires and other cable type of connections.

The undesirability of connecting mechanical links between the control device and the searchlight become obvious when it is necessary to thread the mechanical connecting link through bulkheads, fired walls, and other similar types of barriers where sharp changes in direction may occur. Certain prior art systems have been developed to remotely control spotlights through the use of servo-mechanisms and reversible motors. However, these systems have been generally utilized in connection with a single remote control location. In certain applications, for example the boat application, where there is a main cabin control and a flybridge control, it has been found desirable to provide remote control of the searchlight from both locations. However, it is necessary to lock out one control when the other control is being actuated. Certain lock out mechanisms have been provided in the past. However, these lock out mechanisms normally require the use of a separate switch at each location to lock out the other location and normally the switch must be returned to the normal position to permit control from the other location during subsequent uses of the searchlight.

The system of the present invention is intended to alleviate the defects of the prior systems while maintaining simple reliable control of the searchlight from various remote locations. The system basically includes a double-pole, double-throw switch which is utilized to control the mode of operation of the searchlight, either in the spot or flood mode of operation, a joystick to control the altitude and azimuth of the searchlight through the use of altitude and azimuth reversible motors and a control circuit. A double-pole, double-throw switch and joystick control is provided at each location.

The control circuit includes a logic circuit for locking out one control location once the other control location has been actuated. The actuation is accomplished by moving the double-pole, double-throw switch to the desired mode of operation which, through the logic system, will provide electrical energy to the joystick control and also will remove electrical energy from the non-actuated joystick control. The system includes a pair of nand gates which are cross-coupled to disable one nand gate when the other nand gate has been energized. The system also includes a means for locking out the spot and flood control when one spot or flood control button has been actuated.

OBJECTS AND BRIEF DESCRIPTION OF THE DRAWINGS

Accordingly, it is one object of the present invention to provide an improved remote control spotlight system.

It is another object of the present invention to provide an improved remote control spotlight system which is suitable for multiple control locations.

It is a further object of the present invention to provide a remote control spotlight system, which spotlight system includes a spotlight which can be controlled from more than one remote location, the system including means for locking out one control location when the other control location has been actuated.

It is still another object of the present invention to provide an improved multiple position, remote control spotlight system which includes a lock out circuit for disabling the power supply to one remote control system when the other remote control system has been energized.

It is still a further object of the present invention to provide a remote control spotlight system which is simple to install, reliable in operation, and inexpensive to manufacture.

Further objects, features and advantages of the present invention will become apparent upon a reading of the following specification and claims and a study of the accompanying drawings, in which:

FIG. 1 is a block diagram illustrating the various features of the present invention; and FIG. 2 is a schematic diagram illustrating the specific elements of the system of FIG. 1.

DETAILED DESCRIPTION OF THE DRAWINGS

Figure 1:
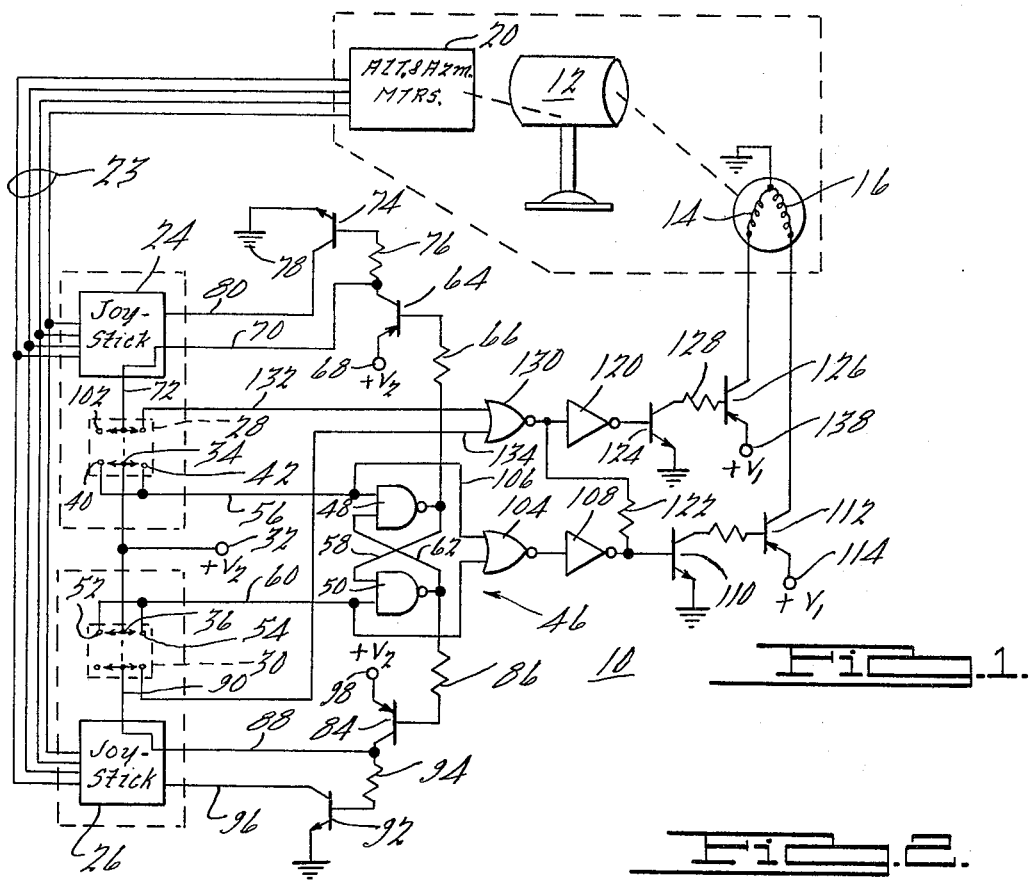

Referring now to FIG. 1, there is illustrated a control system 10 which is utilized to control the position, both altitude and azimuth, of a searchlight 12, the searchlight 12 including a lamp system having a spot filament 14 and a flood filament 16. The position of the spotlight 12, as to altitude and azimuth, is controlled by a pair of altitude and azimuth motors, schematically illustrated at 20, which motors are selectively energized from the control system 10. The filaments 14 and 16 are also selectively energized from the control system 10 in accordance with whether the user wants to provide a spot illumination of an area or to flood the area with light. For purposes of illustrating the invention, the following description will be framed in terms of the boat application. However, it is to be understood that the description is merely illustrative and the invention may be applied to many other areas.

Referring now to the control system 10, there is illustrated a pair of joystick controls 24, 26, the first joystick control 24 being adapted to be mounted in the main cockpit adjacent the other controls for the boat and the second joystick control 26 being adapted to be mounted, for example, on the flybridge. The joystick controls are connected to the azimuth and altitude motors 20 by means of the multiconductor cable 23. The system further includes a pair of double-pole, double-throw switches 28, 30, the switch 28 being adapted to be mounted in the main cabin adjacent the joystick control 24, the second switch 30 being adapted to be mounted adjacent the second joystick control 26 on the flybridge. The switches 28, 30 are basically used to select the flood or spot mode of operation of the searchlight and to seize control of the system from one location while locking out the other remote control location.

Referring now to the switches 28, 30, it is seen that a positive source of potential $V_2$ is supplied from a terminal 32 to the center poles 34, 36 of the switches 28, 30, respectively, and this positive source of supply is continuously fed to the center poles 34, 36. The switches are of the three position type with the center position being off. The switch 28 includes a pair of outboard terminals 40, 42 which terminals are externally connected together and the voltage signal on either terminal 40, 42 is fed to the input circuit of a pair of cross-coupled nand gates, the gates being connected together in the form of a flip flop circuit 46. The flip flop circuit includes a first nand gate 48 to which is fed the input signal from the switch 28 and a second nand gate 50 to which is fed the signal from the second switch 30. The second switch 30 also includes a pair of outboard terminals 52, 54 which are connected together and the voltage signal on either terminal 40, 42 is fed to the input circuit of the gate 50.

Assuming that the double-pole, double-throw switch 28 is moved to either "on" position wherein the center terminal 34 is connected to either terminal 40 or 42, this connection will cause a positive output signal to be fed to the input circuit of flip flop 46, particularly to the input of gate 48 by means of a conductor 56. This will cause the output of gate 48 to go from a logical high level to a logical low level signal. This signal is fed to the input of circuit 50 by means of a cross-coupling conductor 58. This cross-coupling conductor will have a logical low signal fed to its input circuit which signal will maintain the output of nand gate 50 at the logical high level. On the other hand, a signal fed from switch 30 by means of a conductor 60 will cause the output of gate 50 to drop from a logical high to a logical low level. This output signal is fed to the gate 48 by means of a conductor 62 to latch the output of gate 48 at the logical high level.

Assuming that switch 28 has been actuated, the logical low signal from gate 48 is fed to the input circuit of a transistor 64 by means of a resistor 66. This will cause the emitter-base junction of transistor 64 to be forward biased to cause transistor 64 to conduct. The conduction of transistor 64 will connect the positive source of voltage at terminal 68 to the joystick control 24 by means of a conductor 70 and the emitter-collector circuit of transistor 64. This positive signal level is also fed to the center pole of the double-pole, double-throw switch 28 by means of a conductor 72.

The conduction of transistor 64 will cause the conduction of a transistor 74 which is connected to the collector circuit of transistor 64 by means of a resistor 76. The conduction of transistor 74 connects ground potential at 78 to the joystick control 24 by means of a conductor 80. Thus, the actuation of switch 28 causes transistors 64 and 74 to become conductive to connect the voltage source $V_2$ at 68 and to connect ground potential at 78 to the joystick control 24.

With the above conditions existing, the output of nand gate 50 is latched to a logical high level. This high level signal is fed to the base electrode of a transistor 84 by means of a resistor 86. This signal will back-bias the base-emitter junction of transistor 84 to cause transistor 84 to be in the nonconductive state. With transistor 84 nonconductive, no voltage is fed to the joystick control 26 by means of a conductor 88. The joystick control 26 is also connected to the switch 30 by means of a conductor 90. The nonconductive condition of transistor 84 will also render transistor 92 nonconductive. The collector electrode of transistor 84 and the base electrode of transistor 92 are interconnected by means of a resistor 94 and the collector electrode of transistor 92 is connected to the joystick control by means of a conductor 96. If transistor 92 should become conductive, the joystick 26 will be fed ground potential through the collector-emitter path of transistor 92.

If, on the other hand, the switch 30 is actuated, a positive signal will be fed to the nand gate 50 by means of a conductor 60. This will cause the output of nand gate 50 to drop from a logical high level to a logical low level, this low level signal being fed to the transistor 84 by means of the resistor 86. This will cause transistor 84 to become conductive to feed the voltage $V_2$ at input terminal 98 to the joystick control 26 and the double-pole, double-throw switch 30 by means of conductors 88, 90, respectively. Further, the transistor 92 will become conductive due to the conductive condition of transistor 84 to feed ground potential to the joystick control 26 by means of conductor 96.

The output signal from gate 50 is fed to the input circuit of gate 48 by means of a conductor 62. This logical low level signal will latch gate 48 in the reset condition whereby the output thereof remains at the logical high level.

If the user decides to operate the system in the flood mode of operation, either the switch 28 or the switch 30 is thrown to the left whereby the lower center pole 34 comes into contact with terminal 40 and the upper center pole comes into contact with the left terminal 102. This will cause a positive signal to be fed to the output conductor 56, which positive signal, in addition to being fed to the gate 48, is also fed to a gate 104 by means of a conductor 106. This positive signal will cause the output of the gate 104 to go from a logical high to a logical low level, the signal being inverted by means of an inverter circuit 108. The output of the inverter circuit 108 is a high level signal which causes a transistor 110 to become conductive. The conduction of transistor 110 will cause the conduction of an output transistor 112, the emitter-collector circuit of transistor 112 being connected in series circuit with the flood filament 16. This will control the feeding of electrical energy from an input terminal 114 to the lamp filament 16 through the emitter-collector circuit of transistor 112.

On the other hand, if either the double-pole, double-throw switch 28 or 30 is thrown to the right, a positive level signal is fed both to the flip flop circuit 46 and to a gate 130 by means of a conductor 132 or a conductor 134 depending on whether switch 28 or 30, respectively, is actuated. Either signal will cause the output of gate 130 to drop from a logical high to a logical low level, which signal is fed to the input circuit of the inverter 120. This will cause the output of inverter 120 to go high to cause transistors 124, 126 to become conductive. The conduction of transistor 126 will feed a positive voltage to the filament 14 from a terminal 138.

Thus, the output signal level on gate 130 determines the conductive state of inverter circuit 120. The output of gate 130 is also fed to the base electrode of transistor 110 through resistor 122 to lock out the flood filament circuit when the spot filament circuit is being utilized. When the flood filament circuit is being utilized, the spot circuit arrangement is deactivated by either remote control switch since a positive voltage on conductors 70, 72 or 88, 90 is required to activate the spot filament circuit.

On the other hand, the output signal from gate 130 is fed to the base electrode of transistor 110 by means of the resistor 122. In this situation, this logical low signal will cause transistor 110, and thus transistor 112, to become nonconductive to isolate the flood mode filament 16.

Figure 2:
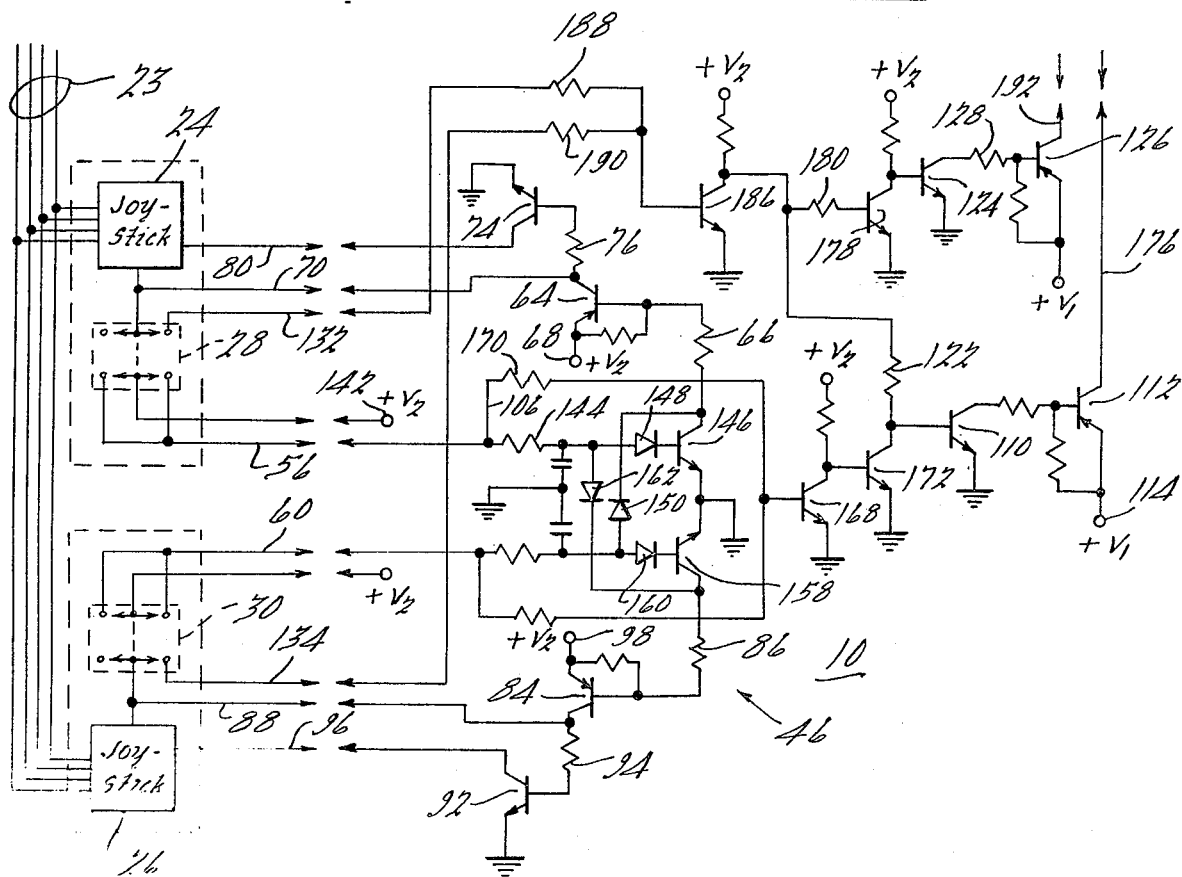

Referring now to FIG. 2, there is illustrated the specific details of certain circuit elements illustrated in block diagram in FIG. 1. For example, the details of the gates 130, 104, inverters 120, 108, and the flip flop 46 are illustrated. It will be noted that corresponding reference numerals from FIG. 1 have been applied to FIG. 2.

Particularly, the switch 28 is provided a positive source of potential from a terminal 142. When the switch is moved to the left, a positive signal is applied to conductor 56 which positive signal is fed to the input circuit of the flip flop 46. The flip flop 46 specifically includes an input resistor 144, the resistor feeding the positive signal to a transistor 146 through a diode 148. This positive signal will cause transistor 146 to conduct thereby grounding the lower end of the resistor 66. This will cause transistor 64 to become conductive to connect the positive source of potential at input terminal 68 to the conductor 70 and thus the joystick control 24 and the switch 28. Also, the conduction of transistor 64 will cause transistor 74 to become conductive and thus connect ground potential to the conductor 80 and thus the joystick 24, through the collector-emitter circuit of transistor 74.

The conduction of transistor 146 will cause the anode of a diode 150 to be placed at very nearly ground potential thereby forward biasing the diode 150. Thus, if a positive signal is fed from the switch 30 to the conductor 60, this signal is shunted through the diode 150 and the collector-emitter circuit of transistor 146 to ground. Thus, the signal cannot reach a transistor 158 or a diode 160 due to the fact that the signal is shunted by the diode 150. On the other hand, if a signal should be first applied to conductor 60, the transistor 158 will become conductive and a diode 162 will be forward biased to shunt any positive signals fed to the conductor 56. In this way, the opposite circuit is latched out once a circuit is energized.

If the transistor 158 is rendered conductive, a ground signal will be fed to the transistor 84 through the resistor 86 to cause transistor 84 to conduct. Thus, a positive source of potential at terminal 98 will be fed to the joystick control 26 and the switch 28 through the conductor 88. The conduction of transistor 84 will also cause the transistor 92 to become conductive thereby connecting ground potential to the conductor 96, and thus the joystick control 26 through the collector-emitter circuit of the transistor 92.

The positive signal on conductor 56 is also fed to a conductor 106 and thence to a transistor 168 by means of a resistor 170. This positive signal will cause transistor 168 to become conductive to thereby ground the collector electrode of the transistor 168. The output of collector electrode of transistor 168 is connected to the base electrode of a transistor 172 thereby rendering transistor 172 nonconductive when transistor 168 is rendered conductive. The nonconduction of transistor 172 will cause transistors 110 and 112 to become conductive and thus energize the flood filament (not shown) connected to a conductor 176.

On the other hand, if a positive signal is fed from either switch 28 or 30, through the conductors 132, 134, these positive signals will be fed to a transistor 186 through either a resistor 188 or a resistor 190. Either one of these signals will cause transistor 186 to become conductive to connect the base electrode of transistor 178 to ground. This ground connection will cause transistor 178 to become nonconductive thereby causing transistors 120 and 126 to become conductive and energize the spot filament connected to a conductor 192. This output signal from transistor 186 is also fed to the base electrode of transistor 110 through a resistor 122. The conduction of transistor 186 will cause the transistor 110 and, thus, transistor 112 to become nonconductive to lock out the flood filament connected to the conductor 176.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an electric motor positioned lamp having at least two modes of operation, the improvement comprising:

a control system for said lamp for controlling the aiming direction of the lamp including the azimuth and altitude of said lamp and at least two modes of operation from at least two space separated locations comprising first and second aiming direction control switches and first and second mode control switches, circuit means interconnecting said control switches and said lamp for controlling the application of energy to said direction control switches and the lamps including means for disabling one of said first and second control switches upon the actuation of one or the other of said first and second control switches, said interconnecting circuit means including a source of electrical energy, means for applying said electrical energy to said direction control switches, and first and second switch means connected between said source of power and each respective direction control switch, the actuation of said one or the other of said first and second control switches energizing one of said switch means to apply said electrical energy to said other direction control switch and disable the other of said switch means to disconnect said electrical energy from said one direction switch, said interconnecting circuit means further including bi-stable circuit means connected to said first and second mode control switches, and mode output circuit means connected to said lamp for controlling the application of electrical energy to said lamp in one of two modes of operation, said bi-stable circuit means enabling one of said output circuit means and disabling the other of said output circuit means in response to the actuation of said one of the other of said first and second control switches.

2. The improvement of claim 1 wherein said other of said first and second control switches is said mode control switches.

3. The improvement of claim 2 wherein said switch means is a three-terminal semiconductor device connected between said source of electrical energy and said direction control switches, the actuation of one of said mode control switches causing one of said semiconductor devices to conduct to connect said electrical energy to said direction control switch and to cause the other of said semiconductor devices to become non-conductive to disconnect said electrical energy from the other direction switch.

4. The improvement of claim 3 wherein said bi-stable circuit means includes first and second gate means, said gate means being cross-coupled to enable one of said gate means and disable the other of said gate means in response to the actuation of said mode control switch.

5. The improvement of claim 6 wherein said output circuit means further includes first and second three-terminal semiconductor devices, the first and second semiconductor devices being connected between a source of electrical energy and said lamp, the second of said output semiconductor means being connected between said source of power and said lamp, said lamp including first and second filaments, the energization of one of said first and second semiconductor devices supplying energy to the respective filament.

6. The improvement of claim 5 wherein said interconnecting circuit means further includes gate means connected between said mode control switches and said output semiconductor means, said gate means further controlling the application of electrical energy to said filament means.

7. The improvement of claim 6 further including second gate means connected between said mode control switches and said output semiconductor means, said first and second gate means cooperating to energize one of said output semiconductor means and deenergize the other of said semiconductor means thereby selecting one filament of said lamp and disabling the other filaments of said lamp.

8. The improvement of claim 9 wherein said interconnecting circuit means further includes first and second three-terminal semiconductor means connected between ground and respective direction control switches, said bi-stable circuit means controlling the application ground potential to one of said direction control switches and disabling the application of ground potential to the other of said direction control switches in response to the actuation of said mode control switch.

9. In an electric motor positioned lamp having at least two modes of operation, the improvement comprising a control system for said lamp for controlling the aiming direction of the lamp including azimuth and altitude of said lamp and at least two modes of operation from at least two space separated locations comprising first and second aiming direction control switches, first and second mode control switches, a power source connected to each of said first and second mode control switches, a bi-stable circuit means connected to said first and second mode control switches, first and second switch means connected to the output of said bi-stable circuit means, each of said switch means being further connected between a power source and one of said direction control switches and controlling the application of power to said direction control switches, said bi-stable circuit means being energized by one of said mode control switches to one of the bi-stable conditions whereby said bi-stable circuit means actuates one of said switch means to connect one of said direction control switches to said power source and disables the other of said switch means thereby preventing the application of power to said other of said direction control switches, and means interconnecting said first and second mode control switches, power source, lamp and direction control means.

10. In an electric motor positioned lamp having at least two modes of operation, the improvement comprising a control system for said lamp for controlling the aiming direction of the lamp including azimuth and altitude of said lamp and at least two modes of operation from at least two space separated locations comprising first and second aiming direction control switches, first and second mode control switches, a power source connected to said first and second mode control switches, a first and second gate means each connected to said first and second mode control switches, said first and second gate means cooperating such that when one mode of operation is selected by one of said mode control switches, selection of another mode of operation is precluded, said lamp having means enabling it to operate in at least two modes independent of each other, a first lamp mode switch means connected between said lamp and a power source, a second lamp mode switch means connected between said lamp and a power source, said first and second lamp mode switch means being connected to and controlled by said first and second gate means.

* * * * *

UNITED STATES PATENT AND TRADEMARK OFFICE
CERTIFICATE OF CORRECTION

PATENT NO. : 3,979,649
DATED : September 7, 1976
INVENTOR(S) : Gerald C. Persha

It is certified that error appears in the above-identified patent and that said Letters Patent are hereby corrected as shown below:

Col. 1, line 24, "fired" should be --fire--.

Col. 7, line 20, (Claim 5), "6" should be --4--.

Col. 7, line 44, (Claim 8), "9" should be --7--.

Signed and Sealed this

Twenty-third Day of November 1976

[SEAL]

Attest:

RUTH C. MASON
*Attesting Officer*

C. MARSHALL DANN
*Commissioner of Patents and Trademarks*